US009070196B2

(12) United States Patent
Jeong et al.

(10) Patent No.: US 9,070,196 B2
(45) Date of Patent: Jun. 30, 2015

(54) APPARATUS AND METHOD FOR ESTIMATING DISPARITY USING VISIBILITY ENERGY MODEL

(71) Applicant: SAMSUNG ELECTRONICS CO., LTD., Suwon-si, Gyeonggi-do (KR)

(72) Inventors: Young Ju Jeong, Seongnam-si (KR); Ho Young Lee, Suwon-si (KR); Ji Won Kim, Seoul (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 13/771,951

(22) Filed: Feb. 20, 2013

(65) Prior Publication Data
US 2013/0223725 A1 Aug. 29, 2013

Related U.S. Application Data

(60) Provisional application No. 61/603,618, filed on Feb. 27, 2012.

(30) Foreign Application Priority Data

Mar. 28, 2012 (KR) .................. 10-2012-0031834

(51) Int. Cl.
G06K 9/40 (2006.01)
G06T 17/00 (2006.01)
H04N 13/00 (2006.01)
G06T 7/00 (2006.01)

(52) U.S. Cl.
CPC ..... *G06T 7/0075* (2013.01); *G06T 2207/10012* (2013.01)

(58) Field of Classification Search
USPC ........ 382/154, 274, 275; 348/42, 43; 345/420
See application file for complete search history.

(56) References Cited

U.S. PATENT DOCUMENTS

| 6,343,150 | B1 | 1/2002 | Darrell et al. | |
| 7,599,547 | B2* | 10/2009 | Sun et al. | 382/154 |
| 7,711,181 | B2* | 5/2010 | Kee et al. | 382/154 |
| 8,280,149 | B2* | 10/2012 | Yu et al. | 382/154 |
| 8,300,085 | B2* | 10/2012 | Yang et al. | 348/42 |

(Continued)

FOREIGN PATENT DOCUMENTS

| KR | 10-2005-0102156 | 10/2005 |
| KR | 10-2006-0063480 | 6/2006 |

(Continued)

*Primary Examiner* — Sheela Chawan
(74) *Attorney, Agent, or Firm* — NSIP Law

(57) ABSTRACT

An apparatus and method for estimating disparity based on a visibility energy model includes an energy calculator to calculate energy related to stereo matching of each of a left image and a right image which constitute a stereo image, a map generator to generate a visibility map for determining an error in disparity between the left image and the right image using the energy, an energy recalculator to recalculate energy with respect to a region including a visibility error generated due to the error in disparity in the visibility map, and a disparity determiner to determine disparity from the stereo image using recalculated energy of each of the left image and the right image.

20 Claims, 14 Drawing Sheets

(56) References Cited

U.S. PATENT DOCUMENTS

| | | | |
|---|---|---|---|
| 2007/0122028 A1* | 5/2007 | Sun et al. | 382/154 |
| 2009/0041336 A1* | 2/2009 | Ku et al. | 382/154 |
| 2009/0067705 A1 | 3/2009 | Yu et al. | |
| 2010/0220932 A1 | 9/2010 | Zhang et al. | |
| 2011/0128282 A1 | 6/2011 | Wang et al. | |
| 2012/0249747 A1* | 10/2012 | Aviv et al. | 348/47 |
| 2012/0321172 A1* | 12/2012 | Jachalsky et al. | 382/154 |

FOREIGN PATENT DOCUMENTS

| | | |
|---|---|---|
| KR | 10-2008-0047459 | 5/2008 |
| KR | 10-2008-0088305 | 10/2008 |
| KR | 10-2008-0092353 | 10/2008 |
| KR | 10-2009-0052889 | 5/2009 |
| KR | 10-2010-0066914 | 6/2010 |
| KR | 10-2010-0095420 | 8/2010 |
| KR | 10-2010-0137282 | 12/2010 |

* cited by examiner

FIG. 2
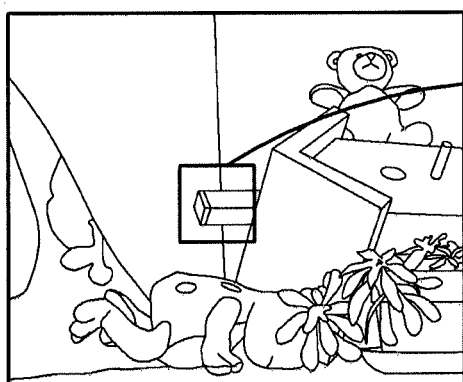
Left image
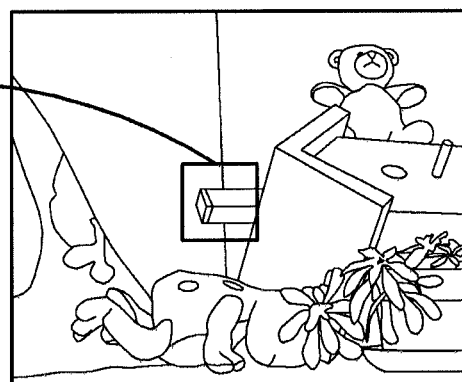
Right image

APPARATUS AND METHOD FOR ESTIMATING DISPARITY USING VISIBILITY ENERGY MODEL

CROSS-REFERENCE TO RELATED APPLICATIONS

This application claims the benefit under 35 U.S.C. §119(e) of U.S. Provisional Application No. 61/603,618, filed on Feb. 27, 2012, in the U.S. Patent and Trademark Office, and the benefit under 35 U.S.C. §119(a) of Korean Patent Application No. 10-2012-0031834, filed on Mar. 28, 2012, in the Korean Intellectual Property Office, the entire disclosures of each of which are incorporated herein by reference.

BACKGROUND

1. Field

One or more embodiments relate to an apparatus and method for estimating disparity in a stereo image based on an energy model that uses a dynamic program.

2. Description of the Related Art

To produce a 3-dimensional (3D) image, restoration of depth information from a color image is necessary. Particularly, a technology for restoring depth information from a stereo image constituted by two images, that is, a left image and a right image, is being studied. Disparity between the left image and the right image needs to be extracted to restore the depth information.

According to related arts, the same energy model is applied throughout an image. Therefore, it is difficult to extract disparity in an occlusion region since the occlusion region does not include a matching region between the left image and the right image.

Accordingly, there is a demand for a technology for extracting disparity more accurately even in an occlusion region in which a matching point between a left image and a right image is absent.

SUMMARY

The foregoing described problems may be overcome and/or other aspects may be achieved by one or more embodiments of a disparity estimation apparatus which may include an energy calculator to calculate energy related to stereo matching of each of a left image and a right image which constitute a stereo image, a map generator to generate a visibility map for determining an error in disparity between the left image and the right image using the energy, an energy recalculator to recalculate energy with respect to a region including a visibility error generated due to the error in disparity in the visibility map, and a disparity determiner to determine disparity from the stereo image using final energy of each of the left image and the right image.

The foregoing described problems may be overcome and/or other aspects may be achieved by one or more embodiments of a disparity estimation apparatus which may include an energy calculator to calculate, in parallel, energy related to stereo matching of each of a left image and a right image which constitute a stereo image, a map generator to generate a visibility map for determining an error in disparity between the left image and the right image using the energy, an energy recalculator to recalculate energy related to a region including a visibility error generated due to the error in disparity in the visibility map of each of the left image and the right image, and a disparity determiner to perform local matching using final energy of each of the left image and the right image and to determine disparity from the local-matched stereo image.

The foregoing described problems may be overcome and/or other aspects may be achieved by one or more embodiments of a disparity estimation method which may include calculating energy related to stereo matching between a left image and a right image which constitute a stereo image, generating a visibility map for determining an error in disparity between the left image and the right image using the energy, recalculating energy related to a region including a visibility error generated due to the error in disparity in the visibility map, and determining disparity from the stereo image using final energy of each of the left image and the right image.

The foregoing described problems may be overcome and/or other aspects may be achieved by one or more embodiments of a disparity estimation method which may include calculating, in parallel, energy related to stereo matching of each of a left image and a right image which constitute a stereo image, generating a visibility map for determining an error in disparity between the left image and the right image using the energy, recalculating energy related to a region including a visibility error generated due to the error in disparity in the visibility map of each of the left image and the right image, and performing local matching using final energy of each of the left image and the right image and determining disparity from the local-matched stereo image.

Additional aspects, features, and/or advantages of one or more embodiments will be set forth in part in the description which follows and, in part, will be apparent from the description, or may be learned by practice of the disclosure. One or more embodiments are inclusive of such additional aspects.

EFFECTS

According to one or more embodiments, a new energy model may be structured with respect to a region in which a visibility error is generated, and smoothness cost may be applied preferentially to matching cost of the energy model in an occlusion region in which the visibility error is generated. Accordingly, extraction of disparity with respect to the occlusion region may be more accurately performed.

BRIEF DESCRIPTION OF THE DRAWINGS

These and/or other aspects and advantages will become apparent and more readily appreciated from the following description of embodiments, taken in conjunction with the accompanying drawings of which:

FIG. 2 is a diagram illustrating stereo matching according to one or more embodiments;

DETAILED DESCRIPTION

Figure 1:
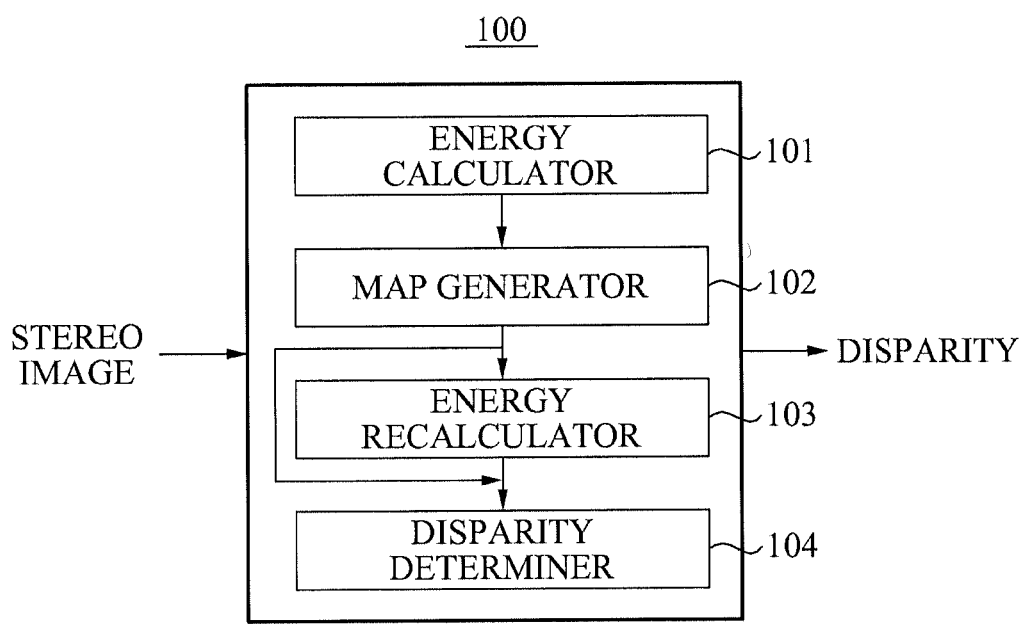
FIG. 1 is a block diagram of a disparity estimation apparatus according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 illustrates a disparity estimation apparatus 100 according to one or more embodiments.

Referring to FIG. 1, the disparity estimation apparatus 100 may include an energy calculator 101, a map generator 102, an energy recalculator 103, and a disparity determiner 104. According to one or more embodiments, the disparity estimation apparatus 100 may restore depth more accurately using visibility for determining an error in disparity between a left image and a right image. In particular, the disparity estimation apparatus 100 may estimate the disparity more accurately based on an energy model, by applying smoothness cost preferentially to matching cost with respect to a region in which a visibility error is generated, such as an occlusion region and a disparity estimation error region. Here, the disparity estimation apparatus 100 may apply an energy modeling method based on dynamic programming.

The energy calculator 101 may calculate energy of each of the left image and the right image, the left image and the right image constituting a stereo image. The energy calculator 101 will be described in further detail with reference to FIG. 4. The left image and the right image may be color images, and the energy relates to stereo matching.

The map generator 102 may generate a visibility map for determining an error in disparity between the left image and the right image using the energy, as will be described in further detail with reference to FIGS. 7 and 8.

The energy recalculator 103 may recalculate energy of the region including the visibility error generated due to the error in disparity in the visibility map. The energy recalculator 103 will be described in further detail with reference to FIG. 9. The energy calculation is not performed with respect to a region not including the visibility error. In the occlusion region including the visibility error, a new energy model is suggested, and smoothness cost is applied preferentially to matching cost. Accordingly, disparity estimation may be performed more accurately with respect to the occlusion region.

The disparity determiner 104 may determine the disparity from the stereo image using final energy of each of the left image and the right image. Here, the final energy refers to energy determined through the energy calculator 101 or energy determined through the energy recalculator 103.

FIG. 2 illustrates stereo matching according to one or more embodiments.

The stereo matching refers to storage of a depth image from a multi view color image. That is, the stereo matching may include storage of a depth image from the left image and the right image, and may further include storage of a depth image from a multi view image.

A method of restoring the depth image through the stereo matching will be described. In detail, disparity, which indicates a distance from a multi view image to identical 3-dimensional (3D) points, may be determined by finding a matching point using the left image and the right image having different views. Accordingly, depth of the 3D points may be estimated using the determined disparity.

Referring to FIG. 2, according to the stereo matching, identical 3D points are found from images of different views, such as the left image and the right image, and disparity, that is, the distance between the 3D point located in the left image and the 3D point located in the right image may be estimated.

Methods for obtaining 3D information through the stereo matching include a global method and a local method. The global method sets all pixels of an image as nodes, and sets a region including 4 neighboring pixels in each node. Therefore, the global method finds optimal disparity from the region including the 4 neighboring pixels. The local method extracts most optimally matched disparity from a local region of an image, not considering the entire part of the image.

<Energy Calculation>

Energy calculation is necessary when the stereo matching is performed in the global method. Energy may be referred to as a total cost when a possible disparity is allocated to each pixel. That is, when a stereo image is input, in which a number of horizontal pixels is w, a number of vertical pixels is h, and a number of possible disparities is d, the cost corresponding to w*h*d may be a number of determinable solutions. According to the global method, a disparity corresponding to a minimum value among the solutions may be estimated. That is, an optimization method based on the global method selects the minimum value, instead of calculating values of all cases corresponding to w*h*d.

To optimize the entire image at one time, not only neighboring pixels but also distant pixels need to be taken in consideration. However, as aforementioned, when the energy of the region including the 4 neighboring pixels is defined, the energy may be calculated as shown in Equation 1.

$$E(d)=E_{data}(d)+\lambda E_{smoothness}(d) \quad \text{[Equation 1]}$$

Equation 1 indicates a global energy model for the stereo matching. In Equation 1, E(d) denotes a global energy which is determined by energy $E_{data}(d)$ related to a particular pixel and energy $E_{smoothness}(d)$ related to a neighboring pixel of the particular pixel. That is, the energy $E_{data}(d)$ may be determined by a color difference or a disparity difference between a particular pixel of the left image and a particular pixel of the right image. In addition, the energy $E_{smoothness}(d)$ may be determined by a color difference or a disparity difference between neighboring pixels of the particular pixel of the left image and neighboring pixels of the particular pixel of the right image. Here, d denotes the disparity between the left image and the right image. The global energy may be determined by an absolute difference and a sum absolute difference. In Equation 1, $E_{smoothness}(d)$ may indicate that the neighboring pixels of the particular pixel need to have similar disparities.

<Dynamic Programming>

An optimization method for dynamic programming makes sequential sub-problems corresponding to variables, instead of processing all the variables simultaneously, and finds optimal values for minimizing the sub-problems.

[Equation 2]

$$E(f_1, \ldots, f_m) = \qquad \text{[Equation 2-(1)]}$$
$$D_1(f_2) = \min_{f_1} E_1(f_1, f_2) + E_2(f_2, f_3) + \ldots + E_{m-1}(f_{m-1}, f_m) \quad \text{[Equation 2-(2)]}$$
$$D_2(f_3) = \min_{f_2}[D_1(f_2) + E_2(f_2, f_3)]$$
$$D_k(f_{k+1}) = \min_{f_k}[D_{k-1}(f_k) + E_k(f_k, f_{k+1})]$$
$$\min_f E(f_1, \ldots, f_m) = \min_{f_m} D_{m-1}(f_m) \quad \text{[Equation 2-(3)]}$$

Equation 2-(1) shows a method for minimizing energy by dynamic programming. When finding a minimum value of energy $E(f_1, \ldots, f_m)$ indicating distribution of variables $f_1, f_2, \ldots, f_m$ without any solver, all energy values determinable from all the variables $f_1, f_2, \ldots f_m$ are calculated and then the minimum value is selected.

However, the foregoing method increases an amount of calculation by geometric progression according to the variables and a range of the variables. To possibly overcome this, the dynamic programming according to the global method may not apply all values to find a value minimizing the energy. That is, the dynamic programming may not process the energy of each variable as an individual energy as shown in Equation 2-(1) but may solve the sub-problems as shown in Equation 2-(2).

Equation 2-(2) shows an operation of storing the minimum values of the sequential sub problems and energy values of the variables $f_1, f_2, \ldots f_m$ or determining the minimum values. Finally, the minimum values of the sub problems of Equation 2-(2) may be tracked using variables minimizing respective operations as shown in Equation 2-(3). Accordingly, a result of global optimization for minimizing $E(f_1, \ldots, f_m)$ of Equation 2-(1) may be determined.

<Stereo Matching Using Dynamic Programming>

Equation 2 may be applied to Equation 1, thereby resulting in Equation 3 as follows.

$$E(p_{(x,y)}, d) = \qquad \text{[Equation 3]}$$
$$E_{data}(p_{(x,y)}, d) + \min_{d_i \in d_{max}}[E(p_{(x-1,y)}, d_i) + E_{smoothness}(d_i, d)]$$

In Equation 3, p(x,y) may denote a particular pixel, p(x−1, y) may denote a neighboring pixel distanced from the particular pixel by a disparity $d_i$ between the particular pixel and the neighboring pixel, and d may denote a maximum value of the disparity $d_i$. Each pixel included in a corresponding image may be a variable of Equation 2. The variables may have any values within a disparity range. In the sub-problems of the stereo matching, the particular pixel p(x,y) and the neighboring pixel p(x−1,y) located before the particular pixel p(x,y) may be determined using disparity and energy of the neighboring pixel p(x−1,y) that minimizes an energy function of Equation 2-(3). As disparity and energy with respect to all pixels from a first pixel to a last pixel of the image are determined using Equation 2-(3) in the foregoing manner, disparities of the respective pixels for minimizing energy of the entire image may be determined.

Figure 3:
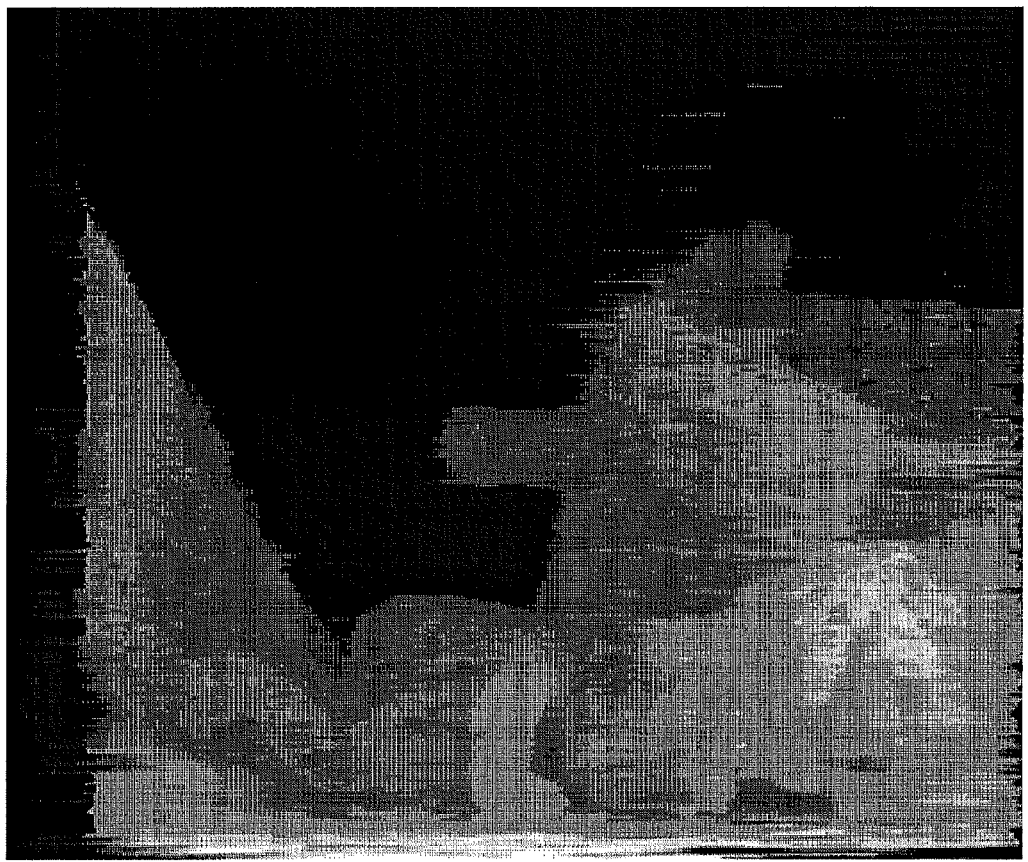
FIG. 3 is a diagram illustrating a disparity map estimated by dynamic programming according to one or more embodiments.

FIG. 3 illustrates a disparity map estimated by dynamic programming according to one or more embodiments.

Although dynamic programming as described above may simplify the global method, presence of only one neighboring pixel is allowed when the entire image is divided into the sequential sub problems according to dynamic programming.

Therefore, for application of dynamic programming to stereo matching, matching needs to be performed in units of a scan line. According to the stereo matching in units of the scan line, a disparity map in which an artifact is generated may result as shown in FIG. 3.

Therefore, according to the one or more embodiments, a method for removing the artifact while maintaining the dynamic programming will be suggested.

Figure 4:
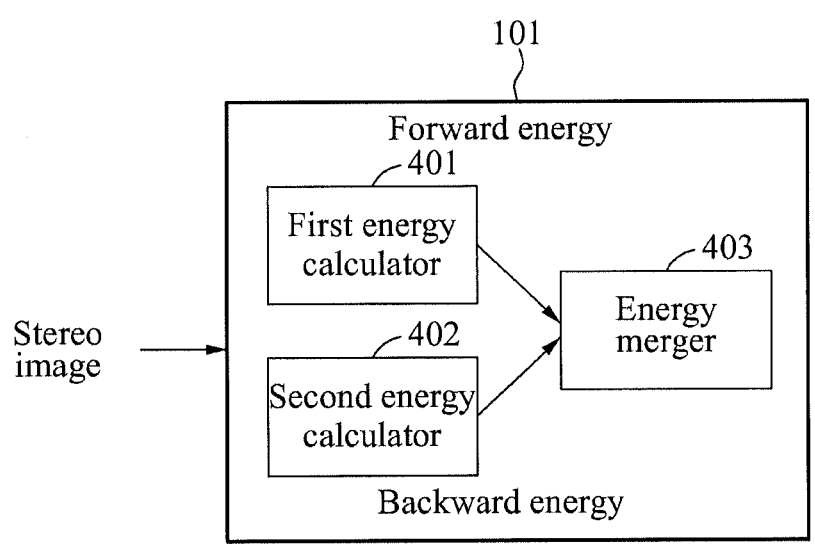
FIG. 4 is a block diagram illustrating an energy calculator of a disparity estimation apparatus according to one or more embodiments.

FIG. 4 illustrates an energy calculator 101 of a disparity estimation apparatus according to one or more embodiments in detail.

Referring to FIG. 4, the energy calculator 101 may include a first energy calculator 401, a second energy calculator 402 and an energy merger 403.

Figure 5:
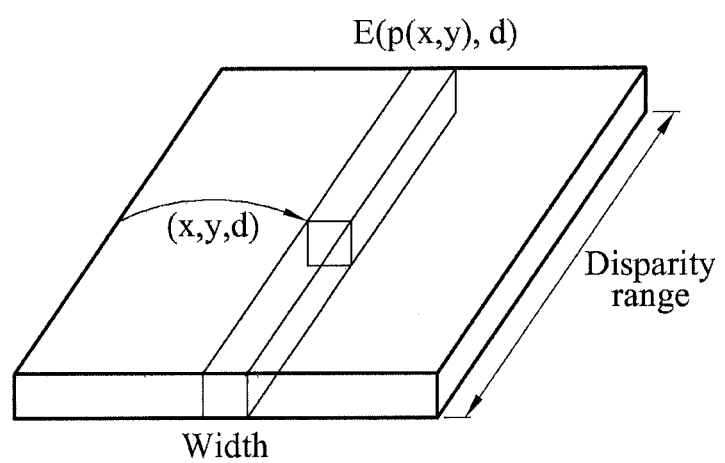
FIG. 5 is a diagram for describing a process of calculating energy in a forward direction, according to one or more embodiments.

The first energy calculator 401 may calculate forward energy with respect to each of a left image and a right image. The second energy calculator 402 may calculate backward energy with respect to each of the left image and the right image. Here, the first energy calculator 401 and the second energy calculator 402 may calculate the energy using Equation 3. The first energy calculator 401 may calculate energy in a forward direction as shown in FIG. 5. The second energy calculator 402 may calculate energy in a backward direction in the same manner as shown in FIG. 5. As aforementioned, the energy relates to stereo matching and may be determined by a disparity difference or a color difference between pixels located in the left image and pixels located in the right image.

Figure 6:
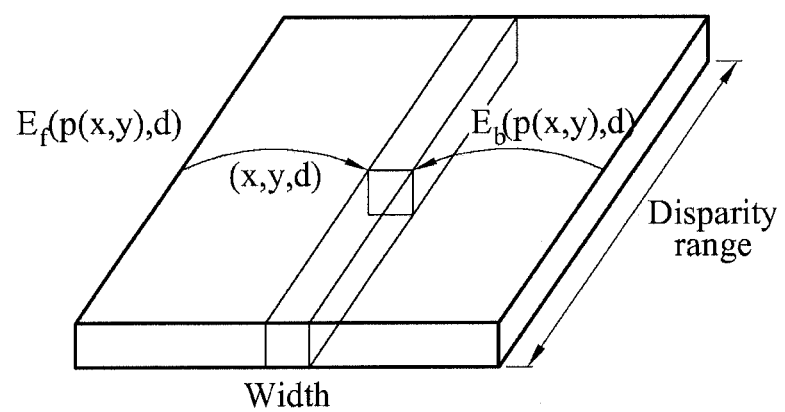
FIG. 6 is a diagram for describing a process of calculating energy in consideration of both a forward direction and a backward direction, according to one or more embodiments.

The energy merger 403 may merge the forward energies and the backward energies. As shown in FIG. 6, the energy merger 403 may obtain the energy through dynamic programming in a horizontal line. Here, a final merged energy may be calculated using Equation 4.

[Equation 4]

$$E(p_{(x,y)}, d) = E_f(p_{(x,y)}, d) + E_b(p_{(x,y)}, d)$$
$$E_f(p_{(x,y)}, d) = E_{data}(p_{(x,y)}, d) + \min_{di \in dmax}[E(p_{(x-1,y)}, d_i) + E_{smoothness}(di, d)]$$
$$E_b(p_{(x,y)}, d) = E_{data}(p_{(x,y)}, d) + \min_{di \in dmax}[E(p_{(x+1,y)}, d_i) + E_{smoothness}(di, d)]$$

In Equation 4, E(p(x,y), d) denotes energy based on a disparity d of a particular pixel p(x,y). $E_f$(p(x,y), d) denotes forward energy based on the particular pixel p(x,y) and a neighboring pixel p(x+1,y) of the particular pixel p(x,y). $E_b$(p(x,y), d) denotes backward energy based on the particular pixel p(x,y) and the neighboring pixel p(x+1,y). di denotes a disparity between the particular pixel and the neighboring pixel, and d denotes a maximum value of the disparity di.

Respective pixels p(x,y) included in the image each may include a variable di that may change by as much as a disparity range d. The variable di may be allocated to minimum energy determined by Equation 3. When Equation 2-(2) is not used, a value of d meeting $$\min_{d \in dmax} [E(p_{(x,y)}, d)]$$

may become a disparity of the variable of the particular pixel p(x,y).

Figure 10:
FIG. 10 is a diagram illustrating a disparity map determined using forward energy according to one or more embodiments.
Figure 11:
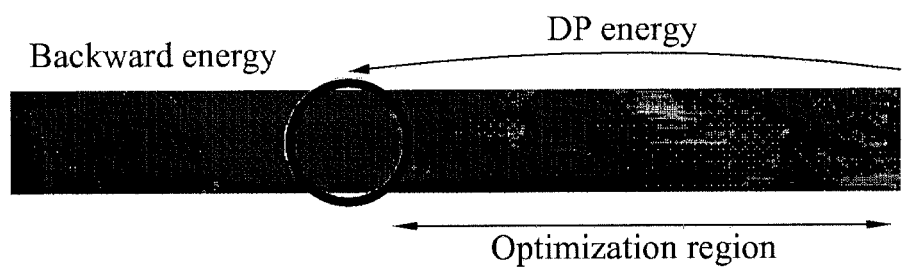
FIG. 11 is a diagram illustrating a disparity map determined using backward energy according to one or more embodiments.
Figure 12:
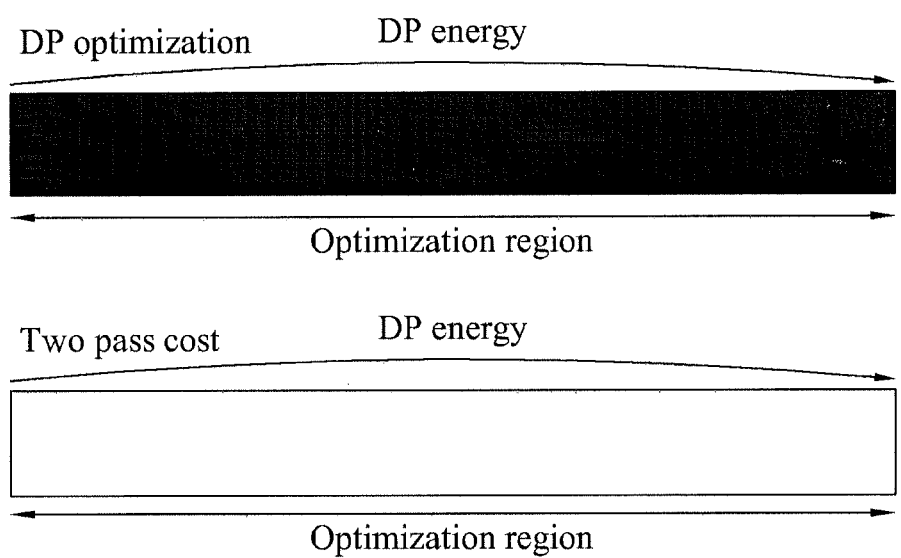
FIG. 12 is a diagram illustrating a disparity map determined in consideration of both a forward direction and a backward direction, and a disparity map using optimization of dynamic programming, according to one or more embodiments.

Equation 3 calculates cost of energy of only one direction. In this case, an error by a smoothness term may occur in a region in which the disparity abruptly changes. Here, the error may refer to circular regions shown in FIGS. 10 and 11. To solve the error, according to one or more embodiments, a result of merging the forward energy and the backward energy of the particular pixel may be used as an energy cost of the dynamic programming as shown in Equation 4. FIG. 10 illustrates a disparity determined in the forward direction and FIG. 11 illustrates a disparity determined in the backward direction. FIG. 12 illustrates a disparity map obtained through optimized dynamic programming, and a disparity determined by Equation 4 which calculates a sum of the forward energy and the backward energy. That is, in FIG. 12, the artifact which is the error shown in FIGS. 10 and 11 is not generated.

Figure 7:
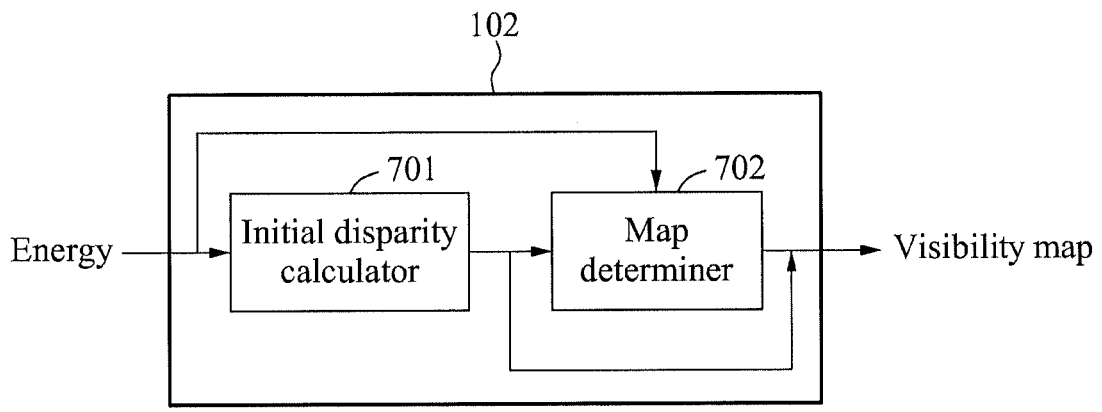
FIG. 7 is a block diagram illustrating a map generator according to one or more embodiments.

FIG. 7 illustrates a map generator 102 according to one or more embodiments in detail.

In the stereo matching, to recalculate energy of the region in which visibility errors are generated after global energy is obtained, the region in which visibility errors are generated needs to be clearly defined. Energy of a region in which no visibility errors are generated may be used as it is, since the energy is optimized. To determine an error in the visibility map, calculation of initial disparities of the left image and the right image is needed. Next, the region in which the error is generated may be recognized through visibility check. The visibility map is used for determining the error in disparity. When the error in disparity is generated due to the occlusion region, it may be determined that a visibility error exists. Here, presence of the error in disparity may be expressed by on and off.

Referring to FIG. 7, the map generator 102 may include an initial disparity calculator 701 and a map determiner 702.

The initial disparity calculator 701 may calculate the initial disparity of each of the left image and the right image, using the energy of the left image and the right image. In particular, the initial disparity calculator 701 may calculate the initial disparity of the left image and the right image using $$\min_{d \in dmax} [E(p_{(x,y)}, d)].$$

The map determiner 702 may determine a visibility map of each of the left image and the right image using the initial disparity of each of the left image and the right image, respectively. The map determiner 702 will be described in detail with reference to FIG. 8.

Figure 8:
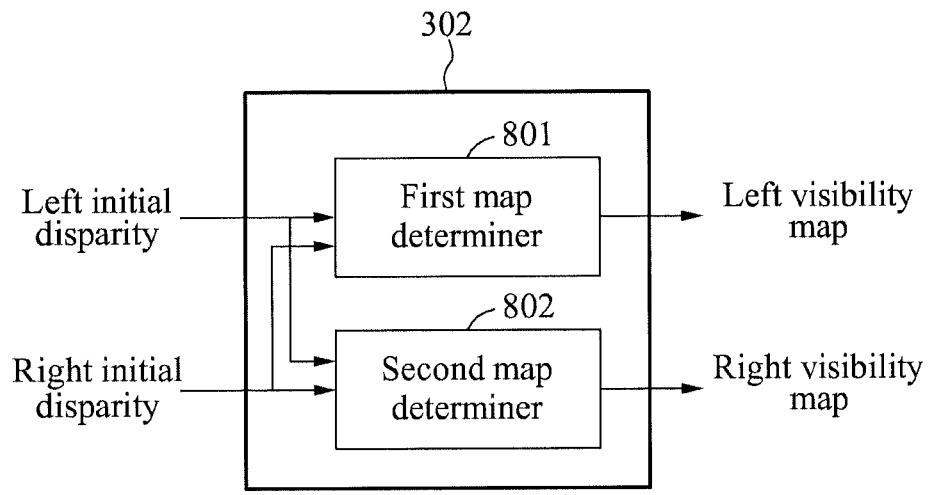
FIG. 8 is a block diagram illustrating a map determiner according to one or more embodiments.

FIG. 8 illustrates a map determiner 702 according to one or more embodiments in detail.

Referring to FIG. 8, the map determiner 702 may include a first map determiner 801 and a second map determiner 802.

The first determiner 801 may determine the visibility map with respect to the left image using the initial disparity of the right image. Conversely, the second map determiner 802 may determine the visibility map with respect to the right image using the initial disparity of the left image. For example, the first map determiner 801 and the second map determiner 802 may use Equation 6 in determining the visibility maps.

[Equation 6]

$$D_L(p_{(x,y)}) = D_R(p_{(x-D_L(p_{(x,y)}),y)}) \qquad 6\text{-}(1)$$

$$D_L(p_{(x,y)}) < D_R(p_{(x-D_L(p_{(x,y)}),y)}) \qquad 6\text{-}(2)$$

In Equation 6, $D_L$ denotes the disparity in the left image and $D_R$ denotes the disparity in the right image. Equation 6-(1) shows a matching region between the left image and the right image. Equation 6-(2) shows an occlusion region in which the left image and the right image do not match each other.

When the left image and the right image match each other, a disparity of a first pixel in the left image is to be equal to a disparity of a second pixel of the right image, located in a position moved by as much as the disparity of the first pixel, as in Equation 6-(1). An occlusion region of the left image refers to a blocked region by a foreground in the right image. Therefore, when searching, from the right image, for a pixel corresponding to the pixel located in a position moved by as much as the disparity of the occlusion region of the left image, the disparity of the right image needs to be greater than the disparity of the left image as shown in Equation 6-(2).

Figure 13:
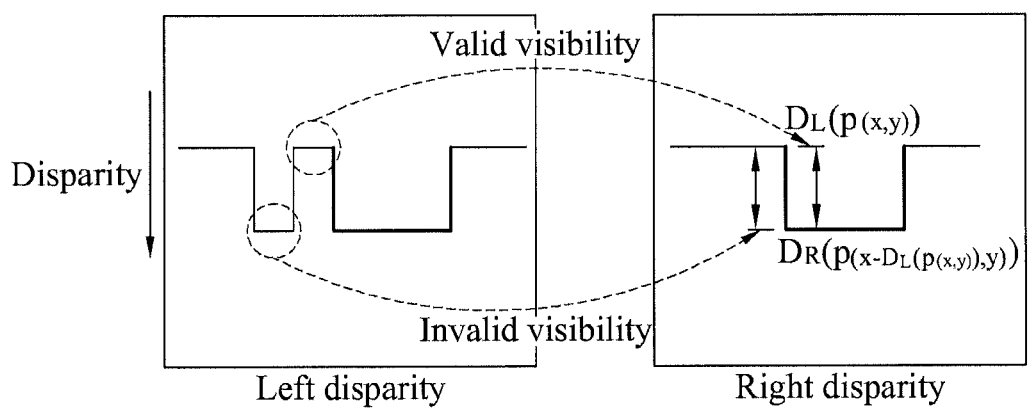
FIG. 13 is a diagram illustrating a valid region and an invalid region of a visibility map, according to one or more embodiments.

However, when the disparity of the left image is greater, different from the case of Equation 6-(2), a region to be seen in the right image may not be actually seen in the right image. That is, the visibility error occurs in the region. FIG. 13 illustrates a valid region, that is, a region not including an error, and an invalid region, that is, a region including an error, of a visibility map according to one or more embodiments. As aforementioned, the visibility map is used to determine the error in disparity in relation to the left image and the right image.

Figure 9:
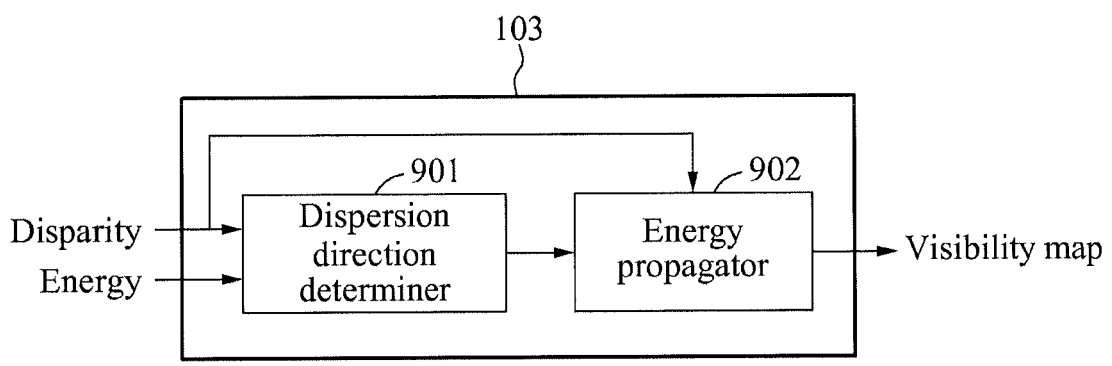
FIG. 9 is a block diagram illustrating an energy recalculator according to one or more embodiments.

FIG. 9 illustrates an energy recalculator 103 according to one or more embodiments in detail.

Referring to FIG. 9, the energy recalculator 103 may include a propagation direction determiner 901 and an energy propagator 902. The energy recalculator 103 may recalculate energy of a visibility error region (VER) in which the visibility error is generated, in the visibility map.

The energy recalculator 103 may recalculate the energy according to Equation 7.

$$E(d) = E_{data}(d) + \lambda E_{smoothness}(d) + E_{visibility}(d) \qquad [\text{Equation 7}]$$

In Equation 7, a visibility term $E_{visibility}(d)$ is added to Equation 1. In the stereo matching, an occlusion region in which the left image and the right image do not match may exist. According to Equation 1, when colors of pixels are similar due to the smoothness term $E_{smoothness}(d)$, a disparity of the particular pixel may be similar to a disparity of the neighboring pixel of the particular pixel. When colors of the pixels are obviously different, the particular pixel may have energy distribution allocated with a different value from the disparity of the neighboring pixel. However, since estimation of the disparity of the occlusion region using only the smoothness term $E_{smoothness}(d)$ is deficient, the energy may be recalculated according to Equation 8.

$$E_{f,b}(p_{(x,y)}, d) = E_{visibility}(p_{(x,y)}, d) + E_{data}(p_{(x,y)}, d) + \qquad [\text{Equation 8}]$$
$$\min_{di \in dmax} [E(p_{(x \mp 1, y)}, d_i) + E_{smoothness}(di, dp)]$$

Equation 8 shows a stereo matching function based on dynamic programming considering a visibility. Since the visibility is independent from the neighboring pixel p(x−1,y) or p(x+1,y), the visibility is considered only in the particular pixel p(x,y).

The propagation direction determiner 901 may determine the propagation direction of the energy in the region including the visibility error, using the initial disparities of the left image and the right image. That is, the propagation direction determiner 901 may determine a propagation direction of the energy to be allocated to the region including the visibility error.

When the stereo matching is performed, the visibility error occurs in the occlusion region and an error region. The occlusion region includes no matching point between the left image and the right image. Therefore, a penalty of the smoothness term $E_{smoothness}(d)$ needs to be higher than a penalty of the data term $E_{data}(d)$ in the energy model.

$$E_{smoothness}(di, d) = \begin{cases} 0 & \text{if } d = di \\ V(p) \times (1 + \text{Const}) & \text{if } d \neq di \end{cases}$$

$$\begin{cases} V(p) = 1 & \text{invalid visibility} \\ V(p) = 0 & \text{valid visibility} \end{cases}$$

[Equation 9]

Equation 9 is an equation for adjusting the penalty of the smoothness term $E_{smoothness}(d)$ in the visibility map. d denotes a maximum disparity in the particular pixel p, and di denotes a disparity corresponding to a variable. V(p) denotes a validity of the particular pixel p in the visibility map. When V(p) is 1, the particular pixel is located in an invalid region in the visibility map. When V(p) is 0, the particular pixel is located in a valid region. When the particular pixel is located in an invalid region, a factor of the smoothness term $E_{smoothness}(d)$ may be increased according to Equation 9, to increase the penalty.

However, the matching point may not be found by only giving the penalty to the smoothness term $E_{smoothness}(d)$ according to the color difference between the left image and the right image. In this case, when the colors of the particular pixel and the neighboring pixel are similar, a disparity similar to the disparity of the particular pixel may be allocated to the neighboring pixel (Type I). When the colors are different between the particular pixel and the neighboring pixel, a disparity different from the disparity of the particular pixel may be allocated to the neighboring pixel (Type II).

$$VER\_width = X_R(D) - X_L(D) \quad \text{[Equation 10]}$$

In Equation 10, VER_width denotes an area of the VER in which the visibility error is generated. $X_L(D)$ denotes a disparity of a left pixel that corresponds to a starting point in a horizontal direction with respect to the invalid region including the visibility error. $X_R(D)$ denotes a disparity of a right pixel that corresponds to an end point in the horizontal direction with respect to the invalid region including the visibility error. When Equation 10 is satisfied, the invalid region becomes Type I or Type II. In this case, in a region satisfying Equation 10, an ordering constraint is met and energy propagation may be performed in a background. A region not meeting Equation 10 corresponds to Type III, in which energy propagation may be performed in both rightward and leftward directions.

That is, according to Equation 10, the propagation direction determiner 901 may determine the propagation direction of the energy according to whether a disparity difference between a pixel located on a left boundary of the invalid region and a pixel located on a right boundary of the invalid region corresponds to an area of the invalid region.

The energy propagator 902 may determine a representative energy in the region including the visibility error, and perform energy propagation based on the representative energy. That is, the energy propagator 902 may determine energy to be propagated and a method for propagating the energy.

For example, the energy propagator 902 may perform energy propagation in any one of a leftward direction, a rightward direction, and both directions, by setting the representative energy as energy of at least one of (i) a left pixel of the pixel located on the left boundary of the region including the visibility error and (ii) a right pixel of the pixel located on the right boundary of the region including the visibility error.

Specifically, in case of Type I, the energy propagator 902 may set energy of a pixel located one pixel next to a left starting pixel leftward in the region including the visibility error, as the representative energy. Therefore, the energy propagator 902 may recalculate the energy according to Equations 8 and 9.

In case of Type II, the energy propagator 902 may set a pixel located one pixel next to a right end pixel rightward in the region including the visibility error, as the representative energy. Therefore, the energy propagator 902 may recalculate the energy according to Equations 8 and 9.

In case of Type III, the energy propagator 902 may set, as the representative energy, both (i) the energy of the pixel located one pixel next to the left starting pixel leftward in the region including the visibility error, and (ii) the energy of the pixel located one pixel next to the right end pixel rightward in the region including the visibility error. In this case, after performing energy propagation in both directions, the energy propagator 902 may recalculate the energy as a sum of the two energies.

FIG. 10 illustrates a disparity map determined using forward energy according to one or more embodiments. FIG. 11 illustrates a disparity map determined using backward energy according to one or more embodiments.

In FIGS. 10 and 11, the circular regions may refer to regions in which the visibility error is generated. In a case shown in FIGS. 10 and 11, the visibility error occurs on a path from a foreground to a background. Here, since the forward direction and the backward direction are different as shown in Equation 4, the regions in which the visibility error is generated are different as shown in FIGS. 10 and 11.

FIG. 12 illustrates a disparity map determined in consideration of both a forward direction and a backward direction, and a disparity map using optimization of dynamic programming, according to one or more embodiments.

Referring to FIG. 12, the disparity map considering both the forward direction and the backward direction is similar to the disparity map using optimization of dynamic programming. In addition, the artifact shown in FIG. 3 is not generated in FIG. 12.

Figure 14:
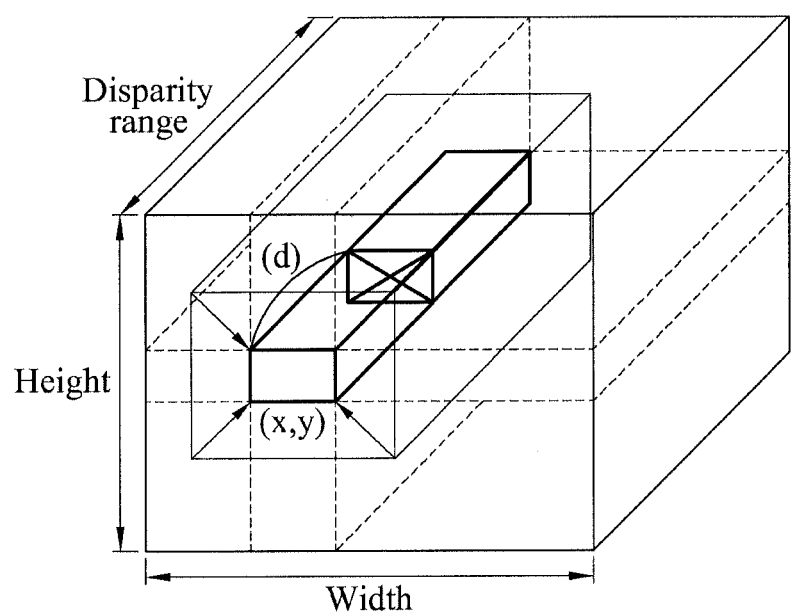
FIG. 14 is a diagram illustrating local matching using energy of dynamic programming, according to one or more embodiments.

FIG. 14 illustrates local matching using energy of dynamic programming, according to one or more embodiments.

The local matching shown in FIG. 14 may be determined as the energies of the left image and the right image are extracted in parallel and initial disparities generated from visibility maps are mutually used between the left image and the right image. That is, a left visibility disparity map is generated based on the initial disparity of the right image while a right visibility disparity map is generated based on the initial disparity of the left image. Next, when the energy is recalculated in an invalid region in which the visibility error is generated, the left image and the right image may be processed in parallel again.

The local matching of FIG. 14 may be performed according to Equation 11.

$$D(p) = \min_{d \in dmax} \sum_{q \in N3 \times 3(p)} E(q, d) \quad \text{[Equation 11]}$$

D(p) denotes a disparity of when the local matching occurs in a particular pixel p, and q denotes a neighboring pixel located in a 3*3 region corresponding to a disparity d with respect to the particular pixel p. E(q,d) may be determined by Equation 7.

Figure 15:
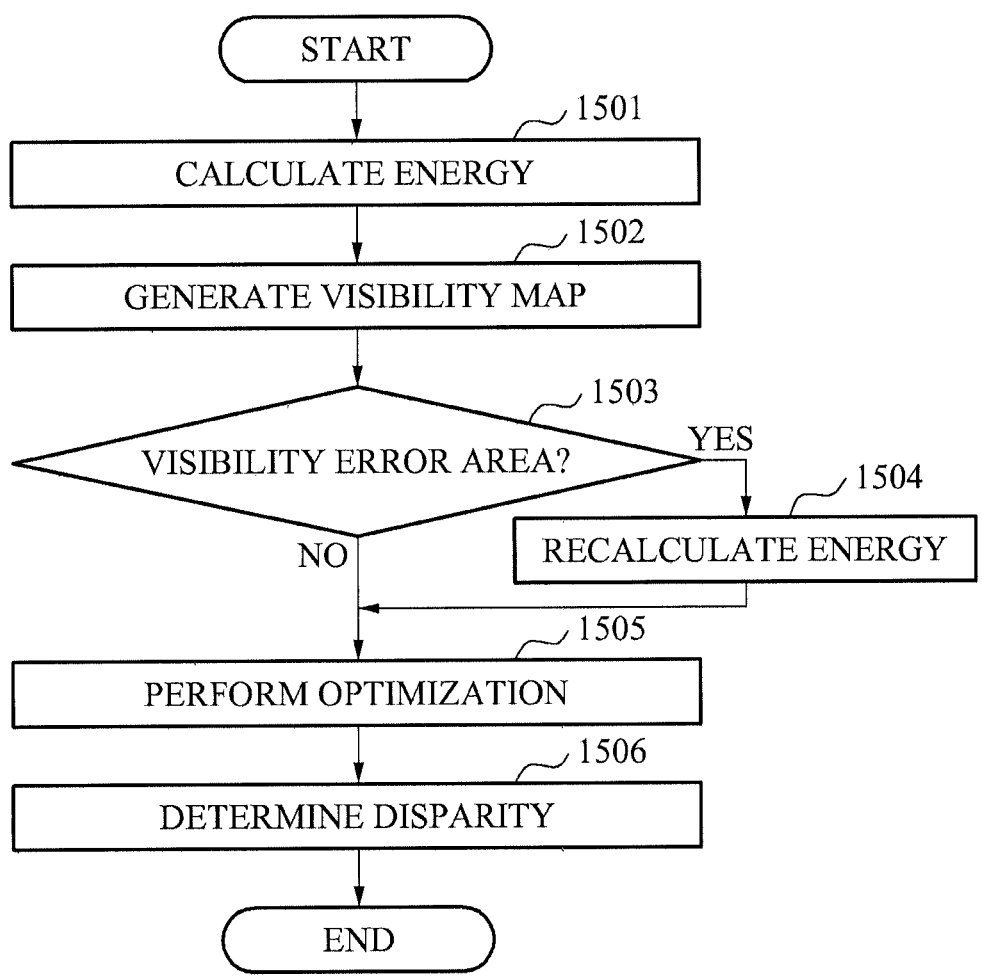
FIG. 15 is a flowchart illustrating a disparity estimation method according to one or more embodiments.

FIG. 15 illustrates a disparity estimation method according to one or more embodiments.

In operation 1501, a disparity estimation apparatus may calculate energy of each of a left image and a right image constituting a stereo image. For example, the disparity estimation apparatus may calculate forward energy and backward energy with respect to each of the left image and the right image. Next, the disparity estimation apparatus may merge the forward energies and the backward energies.

In operation 1502, the disparity estimation apparatus may generate a visibility map using the energies. For example, the disparity estimation apparatus may calculate an initial disparity of each of the left image and the right image, using the energy of each of the left image and the right image. In addition, the disparity estimation apparatus may determine the visibility map of each of the left image and the right image using the initial disparity of each of the left image and the right image, respectively.

Here, the disparity estimation apparatus may determine the visibility map of the left image using the initial disparity of the right image, and determine the visibility map of the right image using the initial disparity of the left image.

In operation 1503, the disparity estimation apparatus may extract a region including a visibility error, from the visibility map.

When the visibility error is generated, the disparity estimation apparatus may recalculate energy with respect to the region including the visibility error in operation 1504. For example, the disparity estimation apparatus may determine a propagation direction of the energy in the region including the visibility error, using the initial disparities of the left image and the right image. Next, the disparity estimation apparatus may determine a representative energy in the region including the visibility error and perform energy propagation based on the representative energy.

Here, disparity estimation apparatus may determine the propagation direction according to whether a disparity difference between a pixel located on a left boundary of the region including the visibility error and a pixel located on a right boundary of the region including the visibility error corresponds to an area of the region including the visibility error.

In addition, the disparity estimation apparatus may perform energy propagation in any one of a leftward direction, a rightward direction, and both directions, by setting the representative energy as energy of at least one of i) a left pixel of a pixel located on a left boundary of the region including the visibility error and ii) a right pixel of a pixel located on a right boundary of the region including the visibility error.

After the foregoing operations, the disparity estimation apparatus may perform optimization using a finally determined energy in operation 1505, and determine the disparity with respect to the stereo image in operation 1506.

Figure 16:
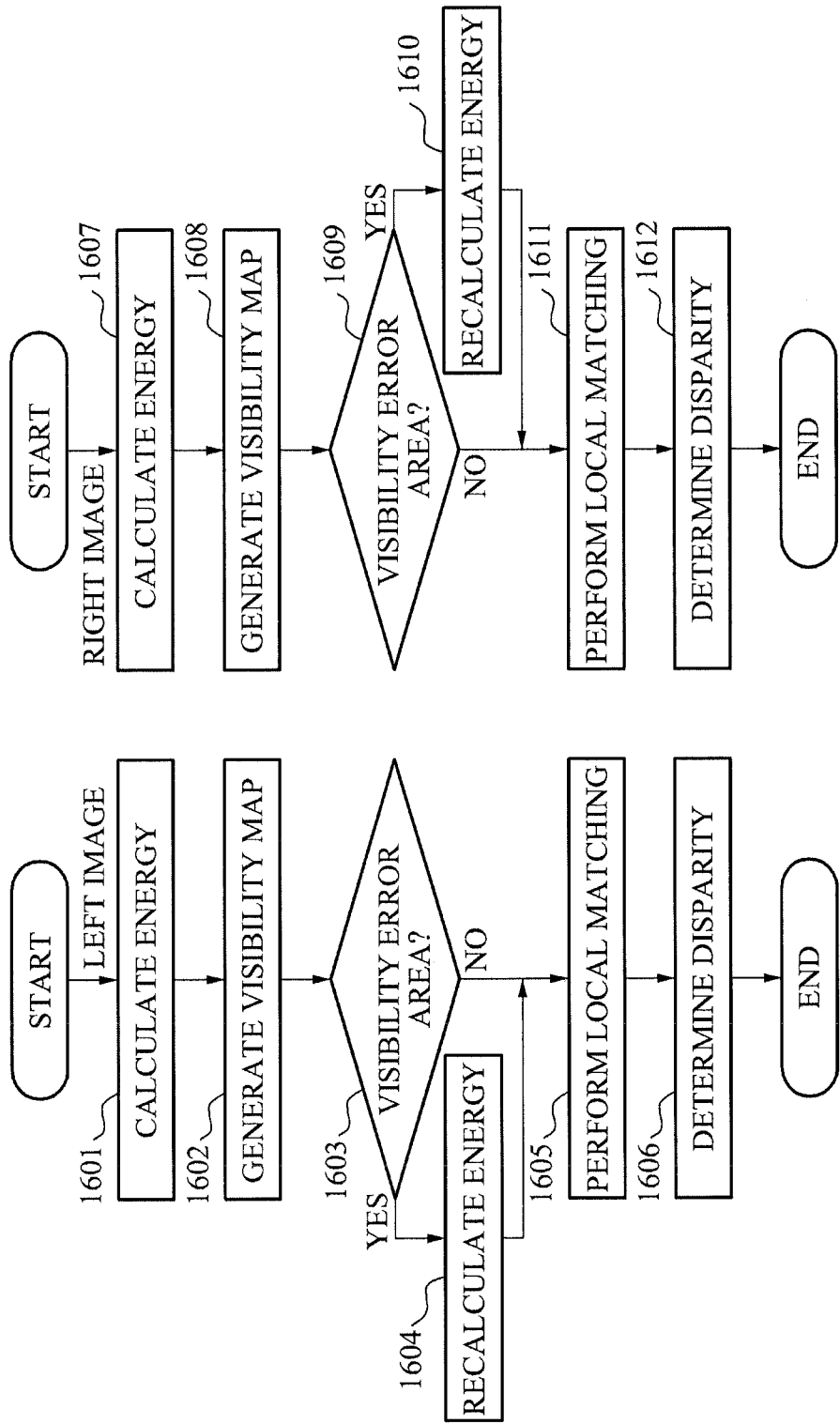
FIG. 16 is a flowchart illustrating a disparity estimation method using local matching, according to one or more embodiments.

FIG. 16 illustrates a disparity estimation method using local matching, according to one or more embodiments.

That is, FIG. 16 shows a left image and a right image are processed in parallel according to the operations of FIG. 15. Therefore, operations 1601 to 1606 and operations 1607 to 1612 of FIG. 16 may be substantially the same as operations 1501 to 1506 of FIG. 15.

However, in operations 1602 and 1608 for generating visibility maps, mutual operation between the left image and the right image may be necessary. That is, the disparity estimation apparatus may generate the visibility map related to the left image by referencing the right image, and generate the visibility map related to the right image by referencing the left image.

In addition, in operations 1605 and 1611 for performing local matching, mutual operation between the left image and the right image may also be necessary. That is, the disparity estimation apparatus may perform local matching with respect to the left image by referencing the right image, and perform local matching with respect to the right image by referencing the left image.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A disparity estimation apparatus comprising:
   an energy calculator to calculate an energy related to stereo matching of each of a left image and a right image which constitute a stereo image;
   a map generator to generate a visibility map for determining an error in disparity between the left image and the right image using the calculated energy;
   an energy recalculator to recalculate the energy with respect to a region in the visibility map including a visibility error generated due to the error in disparity and to maintain the energy with respect to the visibility map outside the region in the visibility map including the visibility error; and
   a disparity determiner to determine disparity from the stereo image using the recalculated energy of each of the left image and the right image.

2. The disparity estimation apparatus of claim 1, wherein the energy calculator comprises:
   a first energy calculator to calculate a forward energy with respect to each of the left image and the right image;
   a second energy calculator to calculate a backward energy with respect to each of the left image and the right image; and
   an energy merger to merge the forward energy and the backward energy.

3. The disparity estimation apparatus of claim 1, wherein the map generator comprises:
   an initial disparity calculator to calculate an initial disparity of each of the left image and the right image; and
   a map determiner to determine a visibility map of each of the left image and the right image using the initial disparity of each of the left image and the right image.

4. The disparity estimation apparatus of claim 3, wherein the map determiner comprises:
   a first map determiner to determine the visibility map of the left image using the initial disparity of the right image; and
   a second map determiner to determine the visibility map of the right image using the initial disparity of the left image.

5. The disparity estimation apparatus of claim 1, wherein the energy recalculator comprises:
   a propagation direction determiner to determine an energy propagation direction in the region including the visibility error; and
   an energy propagator to determine representative energy in the region including the visibility error and to perform energy propagation based on the representative energy.

6. The disparity estimation apparatus of claim 5, wherein the propagation direction determines the propagation direction of the energy according to whether a disparity difference between a pixel located on a left boundary of the region including the visibility error and a pixel located on a right boundary of the region including the visibility error corresponds to an area of the region including the visibility error.

7. The disparity estimation apparatus of claim 5, wherein the energy propagator performs the energy propagation in any one of a leftward direction, a rightward direction, and both directions, by setting the representative energy as energy of at least one of i) a left pixel of a pixel located on a left boundary of the region including the visibility error and ii) a right pixel of a pixel located on a right boundary of the region including the visibility error.

8. A disparity estimation apparatus comprising:
   an energy calculator to calculate an energy related to stereo matching of each of a left image and a right image which constitute a stereo image;
   a map generator to generate a visibility map of each of the left image and the right image for determining an error in disparity between the left image and the right image using the calculated energy;
   an energy recalculator to recalculate the energy related to a region in the visibility map of each of the left image and the right image including a visibility error generated due to the error in disparity and to maintain the energy not related to the region including the visibility error; and
   a disparity determiner to perform local matching using the recalculated energy of each of the left image and the right image and to determine disparity from the local-matched stereo image.

9. A disparity estimation method comprising:
   calculating an energy related to stereo matching between a left image and a right image which constitute a stereo image;
   generating a visibility map for determining an error in disparity between the left image and the right image using the calculated energy;
   recalculating the energy related to a region in the visibility map including a visibility error generated due to the error in disparity and to maintain the energy not related to the region in the visibility map including the visibility error; and
   determining disparity from the stereo image using the recalculated energy of each of the left image and the right image.

10. The disparity estimation method of claim 9, wherein the calculating of the energy of each of the left image and the right image comprises:
    calculating a forward energy with respect to each of the left image and the right image;
    calculating a backward energy with respect to each of the left image and the right image; and
    merging the forward energy and the backward energy.

11. The disparity estimation method of claim 9, wherein the generating of the visibility map comprises:
    calculating an initial disparity of each of the left image and the right image; and determining the visibility map of the left image and the right image using the initial disparity of each of the left image and the right image.

12. The disparity estimation method of claim 11, wherein the determining of the visibility map of each of the left map and the right map, comprises:
   determining the visibility map of the left image using the initial disparity of the right image; and
   determining the visibility map of the right image using the initial disparity of the left image.

13. The disparity estimation method of claim 9, wherein the recalculating of the energy comprises:
   determining an energy propagation direction in the region including the visibility error using the initial disparity of each of the left image and the right image; and
   determining representative energy in the region including the visibility error and performing energy propagation based on the representative energy.

14. The disparity estimation method of claim 13, wherein the determining of the propagation direction of the energy comprises:
   determining the propagation direction of the energy according to whether a difference between a pixel located on a left boundary of the region including the visibility error and a pixel located on a right boundary of the region including the visibility error corresponds to an area of the region including the visibility error.

15. The disparity estimation method of claim 13, wherein the performing of the energy propagation comprises:
   performs the energy propagation in any one of a leftward direction, a rightward direction, and both directions, by setting the representative energy as energy of at least one of i) a left pixel of a pixel located on a left boundary of the region including the visibility error and ii) a right pixel of a pixel located on a right boundary of the region including the visibility error.

16. At least one non-transitory computer readable medium comprising computer readable code to control at least one processing device to implement the method of claim 9.

17. A disparity estimation method comprising:
   calculating an energy related to stereo matching of each of a left image and a right image which constitute a stereo image;
   generating a visibility map of each of the left image and the right image for determining an error in disparity between the left image and the right image using the calculated energy;
   recalculating the energy of each of the left image and the right image related to a region in the visibility map of each of the left image and the right image including a visibility error generated due to the error in disparity and to maintain the energy of each of the left image and the right image not related to the region including the visibility error; and
   performing local matching using the recalculated energy of each of the left image and the right image and determining disparity from the local-matched stereo image.

18. A disparity estimation method comprising:
   calculating an energy related to stereo matching between a left image and a right image which constitute a stereo image;
   calculating an initial disparity of each of the left image and the right image;
   generating a visibility map of the left image and the right image using the initial disparity of each of the left image and the right image;
   determining an energy propagation direction in a region in the visibility map of the left image and the right image including the visibility error using the initial disparity of each of the left image and the right image; and
   determining representative energy in the region including the visibility error and performing energy propagation based on the representative energy to determine an energy;
   determining disparity from the stereo image using the determined energy of each of the left image and the right image.

19. The disparity estimation method of claim 18, wherein the determining of the propagation direction of the energy comprises:
   determining the propagation direction of the energy according to whether a difference between a pixel located on a left boundary of the region including the visibility error and a pixel located on a right boundary of the region including the visibility error corresponds to an area of the region including the visibility error.

20. The disparity estimation method of claim 18, wherein the performing of the energy propagation comprises:
   performs the energy propagation in any one of a leftward direction, a rightward direction, and both directions, by setting the representative energy as energy of at least one of i) a left pixel of a pixel located on a left boundary of the region including the visibility error and ii) a right pixel of a pixel located on a right boundary of the region including the visibility error.

* * * * *